Jan. 31, 1967   J. H. PROWINSKY   3,301,217
BIRD FEEDER
Filed Feb. 11, 1965
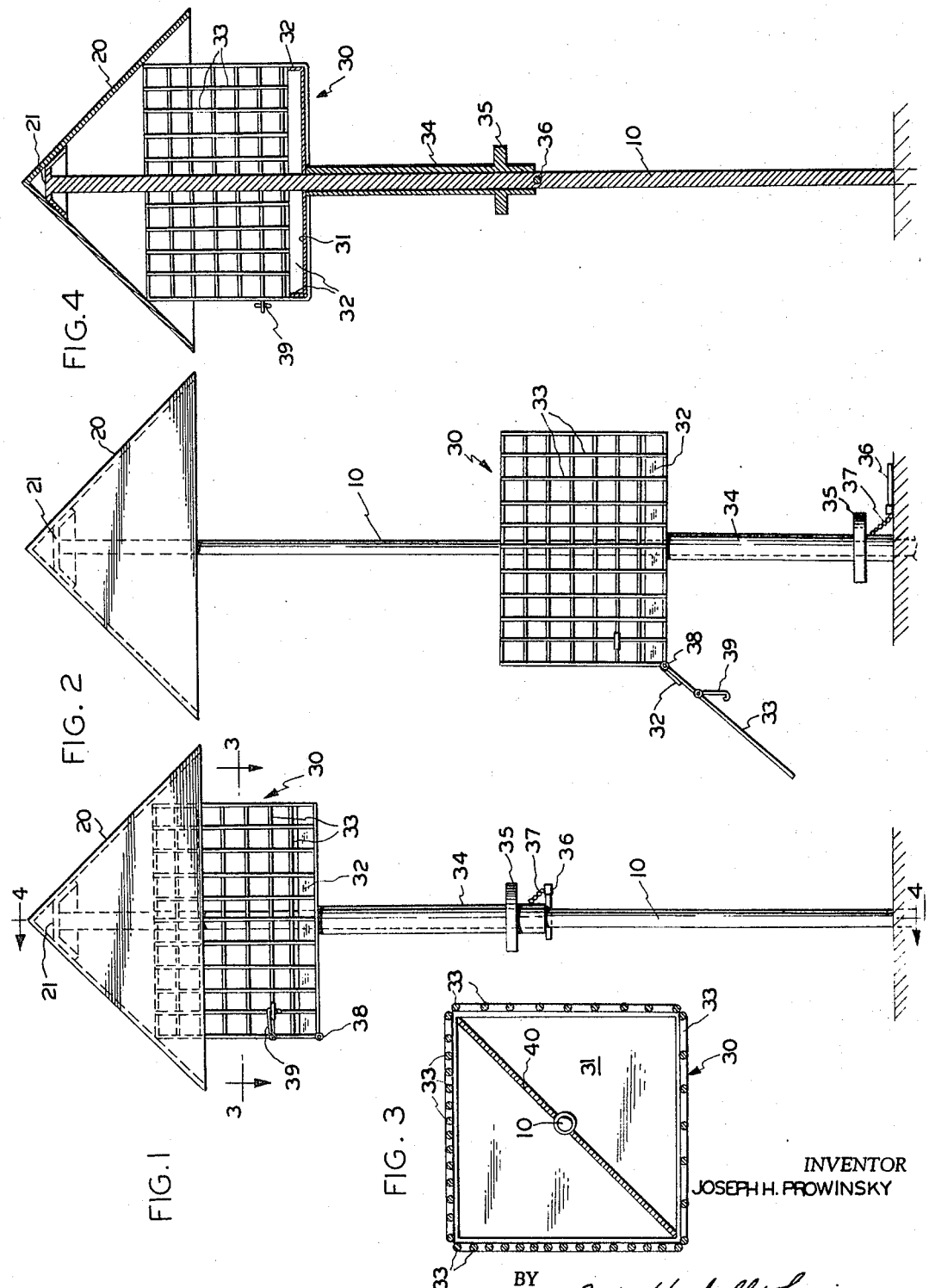
INVENTOR
JOSEPH H. PROWINSKY
BY Paris, Haskell & Levine
ATTORNEYS

United States Patent Office 3,301,217
Patented Jan. 31, 1967

3,301,217
BIRD FEEDER
Joseph H. Prowinsky, 5925 Old Dominion Drive,
McLean, Va. 24019
Filed Feb. 11, 1965, Ser. No. 431,922
4 Claims. (Cl. 119—51)

The present invention relates to bird feeding stations. A bird feeding station desirably possesses several features. It should provide means to shelter the bird feed from adverse elements of the weather; it should locate the feeding area out of reach of other animals so that the feed will not be pirated by undesired intruders, and so that the birds will not be subject to attack or annoyance when feeding; and it should be accessible for cleaning and replenishment of the feed supply.

The present invention is intended to provide a bird feeding station which meets all of the foregoing features. In general, this station utilizes a pole as the support for the station; and a roof structure is mounted on top of the pole. The pole also carries the feed tray structure which is intended to be positioned under the roof structure for protection from adverse elements of the weather. In order to facilitate cleaning and replenishing of the feed tray, the tray is slidably mounted on the pole. The tray may therefore be readily moved between an elevated position under the roof structure, and a lowered position convenient for cleaning and refilling.

It is accordingly one object of the present invention to provide a bird feeding station which is protected from the elements of weather, secure from unwanted intruders, and readily accessible for cleaning and replenishing.

Another object of the present invention is to provide such a bird feeding station wherein the feeding tray is mounted on a pole, and is readily slidable along the pole between an elevated feeding position and a lowered cleaning and refilling position.

Other objects and advantages of the present invention will become apparent to those skilled in the art from a consideration of the following detailed description of one exemplary embodiment of the invention had in conjunction with the accompanying drawings, in which like numerals refer to like or corresponding parts, and wherein:

FIG. 1 is an elevational view of a bird feeding station embodying the features of the present invention, and wherein the feeding tray is in its raised or feeding position;

FIG. 2 is a view similar to FIG. 1, but wherein the feeding tray is in its lowered or cleaning and refilling position;

FIG. 3 is a cross sectional view of the feeding tray, taken along line 3—3 of FIG. 1; and FIG. 4 is a vertical sectional view of the feeding station, taken along line 4—4 of FIG. 1.

The bird feeding station shown in the accompanying drawings comprises a central pole or standard 10, which is intended to be permanently implanted in the ground. Roof 20 constitutes a bottomless protective housing and is fixedly mounted on the top of the pole 10, and feeding tray 30 is telescopically slidably mounted on the pole, so as to be moveable between an elevated position close under the roof 20, as in FIG. 1, and a lowered position close to the ground, as in FIG. 2. In order to place the feeding station at a sufficiently high position to be protected from dogs, cats, mice, squirrels, etc. and to be sufficiently removed from other activities taking place on the ground, the top of pole 10 is desirably eight to ten feet above the ground.

The roof structure 20 may be conveniently permanently affixed to the top of the pole 10 by providing a cross bar 21 under the roof near its apex fixedly secured to the roof and to the top of the pole. If the station is constructed of metal, obviously the cross bar 21 can be welded to the roof and the pole.

The feeding tray 30 is shown as comprising a rectangular base 31 having four upstanding side members 32, forming a shallow dish. A wire mesh panel 33 is attached to each side member 32, completing the side structure of the feeding tray 30. The wire mesh panels 33 have openings selected in size to encourage use of the feeder by desired birds, excluding larger birds. Obviously, if desired, different sizes of wire mesh can be used on different sides, encouraging larger birds to use one section of the feeder, and smaller birds to use a different section. To this end the interior of the feeding tray might be appropriately partitioned in accordance with the arrangement of different mesh sizes, as for example by a diagonal partition 40.

The feeding tray 30 is mounted upon a sleeve 34, the top of the sleeve being attached to the bottom 31 of the tray and depending therefrom. As a unit, the sleeve 34 and feeding tray 30 are telescopically positioned over and are slidable along the post or standard 10. Thus, by grasping the sleeve 34, one may slide the feeding tray assembly up to the roof structure 20, in its normal or feeding position, or lower the assembly until the bottom end of sleeve 34 abuts the ground, placing the feeding tray in convenient position for cleaning and/or refilling. Since the sleeve 34 thus functions as the support for the feeding tray when in lowered position, it is preferable that sleeve 34 be about three or four feet in length, to place the feeding tray at a convenient working height for cleaning and refilling.

The lower end of the sleeve 34 is preferably provided with a hand ring 35 for facilitating movement of the tray assembly up and down along the pole 10. Also, to retain the tray in its upper position, a hole is provided in pole 10 for removably receiving a retaining pin 36. The pin may of course be attached to sleeve 34 by means of a chain or cord 37. With the tray assembly in elevated position and the pin 36 inserted in its hole, the bottom end of sleeve 34 rests on the pin.

To facilitate cleaning the tray 30, one or more of the sides of the tray may be designed to drop. Such a structure has been illustrated in FIGS. 1 and 2, wherein one side of the tray is hinged at 38 to the bottom panel 31, and retained in elevated position by a latching means, such as hook and eye 39.

Thus, when the bird feeder assembly, as shown in FIG. 1 is mounted in the ground, the feeding tray 30 is cleaned and refilled by first pulling pin 36 and then lowering the sleeve 34 telescopically along pole 10 until the bottom of the sleeve 34 hits the ground. The hinged side 32 of the tray is then dropped by releasing the catch 39, facilitating removal of all old feed and debris that may be in the tray. The hinged side of the tray is then returned to its elevated position, and a clean charge of feed is introduced into the tray. By grasping ring 35, the tray assembly can now be lifted aloft along the pole 10 until the tray is positioned under and closely adjacent the roof structure 20; whereupon, the pin 36 is reinserted in its hole in post 10 to retain the feeding tray assembly in its elevated position.

A particularly important feature of the present invention is the slidable relation of the feeding tray to the standard 10, so that it may be conveniently moved between a raised and lowered position. The use of the sleeve 34 in this connection, depending from the tray and cooperating at its bottom end with the retaining pin 36 is also particularly significant, because this relationship enables the tray to be raised to a position above the convenient reach of an average sized person, and at the same time provide a stand for supporting the tray at a convenient working height when the tray is lowered for cleaning. Obviously these features can be effected by modifications of the specific structure here illustrated and described. For example, it is not necessary that the post 10 pass through the feeding tray. It would be possible to mount the tray on the side of the sleeve 34, so that the post 10 would be located alongside and outside of the tray 30. In such event, it obviously would be necessary to similarly locate the roof structure 20 offset from the axis of the post 10 so as to span the tray area.

Using open mesh sides for the feeder, it is obvious that the roof structure will not completely protect the feeding tray in case of a particularly severe storm. However, since the tray assembly is readily lowered and elevated, solid storm panels can easily be attached to the mesh sides to cover the appropriate sides of the tray when such severe conditions are anticipated.

It is obvious that other variations and modifications will become apparent to those skilled in the art. Accordingly, such changes and modifications as are embraced by the spirit and scope of the appended claims are contemplated as being within the purview of the present invention.

What is claimed is:

1. A bird feeder comprising a vertical standard extending a substantial height from ground level, a bottomless protective housing means supported adjacent the top portion of said standard, in fixed position thereon, and a feed tray assembly mounted on said standard for movement therealong between an elevated position adjacent to and under said housing means and inaccessible from ground level and a lowered position removed from said housing means and accessible from ground level, said feed tray assembly comprising a base member, side members including perforated panel means secured to said base member and positioned to extend upwardly from said base member, one of said side members being movable from said position to facilitate cleaning of the tray assembly, said side members retaining feed within the feeder with said perforated panel means providing perch structure for birds, and a guide means depending a substantial distance downwardly from said base member, said guide means being slidably coupled to said standard for guiding said tray assembly in its movement along said standard, and retaining means cooperating with a portion of said guide means adjacent its bottom for holding said feed tray assembly in said elevated position, said guide means depending below the lowermost reach of said housing means when said assembly is in said elevated position, whereby said guide means is accessible below said housing means and from ground level for moving said feed tray assembly between said inaccessible elevated and accessible lowered positions.

2. A feeder as set forth in claim 1, wherein said guide means is provided with a handle adjacent its lower end for facilitating moving said feed tray assembly between said elevated and lowered positions.

3. A feeder as set forth in claim 1, wherein said guide means comprises a sleeve telescopically positioned over said standard.

4. A feeder as set forth in claim 3, wherein said standard passes through said base member at approximately its center.

References Cited by the Examiner
UNITED STATES PATENTS

| | | | |
|---|---|---|---|
| 1,058,796 | 4/1913 | Schott | 119—52 |
| 1,333,775 | 3/1920 | Picotte | 119—61 |
| 2,566,446 | 9/1951 | Gomer | 119—51 |

FOREIGN PATENTS

| | | |
|---|---|---|
| 345,101 | 3/1961 | Great Britain. |

SAMUEL KOREN, *Primary Examiner.*

HUGH H. CHAMBLEE, *Examiner.*